United States Patent
Mizutani

(10) Patent No.: US 11,307,059 B2
(45) Date of Patent: Apr. 19, 2022

(54) LIFE DETECTION DEVICE FOR ENCODER

(71) Applicant: Mitutoyo Corporation, Kanagawa (JP)

(72) Inventor: Miyako Mizutani, Kanagawa (JP)

(73) Assignee: MITUTOYO CORPORATION, Kawasaki (JP)

(*) Notice: Subject to any disclaimer, the term of this patent is extended or adjusted under 35 U.S.C. 154(b) by 231 days.

(21) Appl. No.: 16/746,166

(22) Filed: Jan. 17, 2020

(65) Prior Publication Data
US 2020/0240816 A1 Jul. 30, 2020

(30) Foreign Application Priority Data

Jan. 28, 2019 (JP) .............................. JP2019-012113

(51) Int. Cl.
G01D 5/34 (2006.01)
G01D 5/347 (2006.01)
G01D 3/028 (2006.01)
G01D 11/24 (2006.01)

(52) U.S. Cl.
CPC ......... *G01D 5/34707* (2013.01); *G01D 3/028* (2013.01); *G01D 5/34746* (2013.01); *G01D 11/245* (2013.01)

(58) Field of Classification Search
CPC ............. G01D 5/34707; G01D 5/3473; G01D 5/34746; G01D 3/028; G01D 11/245
See application file for complete search history.

(56) References Cited

U.S. PATENT DOCUMENTS

2005/0171713 A1* 8/2005 Taniguchi .......... G01D 5/24457
702/69
2009/0276180 A1* 11/2009 Schneider ............ G01D 5/3473
702/151
2016/0344429 A1* 11/2016 Ogawa ............... G01D 5/24461

FOREIGN PATENT DOCUMENTS

JP  2000-098052  4/2000

* cited by examiner

Primary Examiner — Kevin K Pyo
(74) Attorney, Agent, or Firm — Rankin, Hill & Clark LLP

(57) ABSTRACT

A life detection device of an encoder is used for the encoder including a scale and a head. The scale is housed in a scale frame. The head relatively moves along the scale to detect an amount of relative movement with the scale. The life detection device includes environmental condition detection means, life determination means, and informing means. The environmental condition detection means is configured to detect an environmental condition related to life detection in the encoder. The life determination means is configured to determine a life of a component constituting the encoder based on a detection result by the environmental condition detection means. The informing means is configured to inform the life based on a determination result by the life determination means.

13 Claims, 13 Drawing Sheets

FIG. 8A

| CURRENT A mA | | HUMIDITY | | |
|---|---|---|---|---|
| | | α % | β % | γ % |
| TEMPERATURE | a°C | | | |
| | b°C | | | |
| | c°C | | | |

FIG. 8B

| CURRENT B mA | | HUMIDITY | | |
|---|---|---|---|---|
| | | α % | β % | γ % |
| TEMPERATURE | a°C | | | |
| | b°C | | | |
| | c°C | | | |

FIG. 8C

| CURRENT C mA | | HUMIDITY | | |
|---|---|---|---|---|
| | | α % | β % | γ % |
| TEMPERATURE | a°C | | | |
| | b°C | | | |
| | c°C | | | |

LIFE DETECTION DEVICE FOR ENCODER

TECHNICAL FIELD

The present invention relates to a life detection device for an encoder.

BACKGROUND ART

Conventionally, a technique that predicts the life of a measuring instrument, such as an encoder, to prevent malfunctioning has been known. For example, a positioning control circuit with a life check function of a photoelectric detector described in Patent Literature 1 includes a light emitter, a light shielding plate having a slit, a light receiver disposed on a side opposite to the light emitter with the light shielding plate interposed therebetween, a control circuit that turns on/off a power source applied to the light emitter as necessary, an output level determination circuit that determines an output level of the light receiver, and a position detection determination circuit. The output level determination circuit and the position detection determination circuit are provided with a life determination circuit. The life determination circuit determines the life based on a voltage level of each device, such as the light emitter and the light receiver. The positioning control circuit with the life check function of the photoelectric detector preliminarily prevents an erroneous operation caused by a decrease in photoelectric conversion efficiency due to the reduced life of the photoelectric detector based on the life determined by the life determination circuit.

CITATION LIST

Patent Literature

Patent Literature 1: JP 2000-98052 A

SUMMARY OF INVENTION

Technical Problem

Here, for example, an encoder is used in a variety of environments, such as a high temperature and humidity environment, an extremely dry environment, and a dusty environment. The encoder is gradually deteriorated over time due to the elapse of years after being manufactured and frequency of usage, and the progress of the deterioration changes depending on the usage environment. For example, the use of the encoder for a long period of time in a high temperature and humidity environment deteriorates the encoder earlier compared with a case of using the encoder in an appropriate environment. Specifically, components provided with the encoder, such as a light emitter and a light receiver, corrode and are deteriorated faster than a case when used in the appropriate environment.

The life determination circuit in the positioning control circuit with the life check function of the photoelectric detector of Patent literature 1 determines the life based on the voltage level of each device, such as the light emitter and the light receiver, but does not consider the progress of deterioration due to the change in the usage environment. As described above, the progress of the deterioration of the encoder changes depending on the usage environment, so when the usage environment is not considered, an error possibly occurs in the determined life. That is, the life of the encoder possibly ends faster than the determined life. As a result, there is a problem that reliability of the encoder probably decreases.

An object of the invention is to provide a life detection device for an encoder that can determine a life of an encoder based on an environmental condition of a usage environment.

Solution to Problem

A life detection device for an encoder according to the invention is the life detection device for the encoder used for the encoder including a scale and a head. The scale is housed in a scale frame. The head relatively moves along the scale to detect an amount of relative movement with the scale. The life detection device for the encoder includes environmental condition detection means, life determination means, and informing means. The environmental condition detection means is configured to detect an environmental condition related to life detection in the encoder. The life determination means is configured to determine a life of a component constituting the encoder based on a detection result by the environmental condition detection means. The informing means is configured to inform the life based on a determination result by the life determination means.

According to the invention, the life detection device for the encoder includes the environmental condition detection means and the life determination means. The environmental condition detection means is configured to detect the environmental condition related to the life detection in the encoder. The life determination means is configured to determine the life of the component constituting the encoder based on the detection result by the environmental condition detection means. Accordingly, the life can be determined based on a usage environment where the encoder is placed, as well as a change in current. Accordingly, the life detection device for the encoder can determine the life of the encoder based on the environmental condition of the usage environment of the encoder.

Then, the following is preferred. The environmental condition detection means includes: a temperature detection unit configured to detect a temperature as the environmental condition; a cumulative total time measurement unit configured to measure a cumulative total operating time of the encoder; and a cumulative total temperature measurement unit configured to measure a cumulative total temperature in the cumulative total operating time. The life detection device includes computing means configured to compute an average temperature value using the cumulative total operating time and the cumulative total temperature. The life determination means is configured to determine the life of the component based on the cumulative total operating time and the average temperature value.

According to such a configuration, the environmental condition detection means includes the temperature detection unit. The temperature detection unit is configured to detect the temperature as the environmental condition. The life detection device includes the computing means. The computing means is configured to compute the average temperature value. The life determination means is configured to determine the life of the encoder based on the cumulative total operating time and the average temperature value. Accordingly, the life of the encoder can be determined based on the change in temperature of the usage environment of the encoder.

Then, the following is preferred. The computing means is configured to compute the average temperature value TAVE.

The life determination means is configured to calculate a life determination time H1 using the average temperature value TAVE, a first constant B, and a second constant C by Equation (1) described in a first embodiment. The life determination time H1 is used by the life determination means for the determination. The life determination means is configured to determine the life of the component based on the life determination time H1 and the cumulative total operating time.

According to such a configuration, the life determination means is configured to calculate the life determination time H1 based on Equation (1). The life determination time H1 is used by the life determination means for the determination. The life determination means is configured to determine the life of the component based on the life determination time H1 and the cumulative total operating time. Therefore, the life determination means based on the change in temperature of the usage environment of the encoder can be easily mounted.

Then, the following is preferred. The environmental condition detection means includes: a humidity detection unit configured to detect a humidity as the environmental condition; a cumulative total time measurement unit configured to measure a cumulative total operating time of the encoder; and a cumulative total humidity measurement unit configured to measure a cumulative total humidity in the cumulative total operating time. The life detection device includes computing means configured to compute an average humidity value using the cumulative total operating time and the cumulative total humidity. The life determination means is configured to determine the life of the component based on the cumulative total operating time and the average humidity value.

According to such a configuration, the environmental condition detection means includes the humidity detection unit. The humidity detection unit is configured to detect the humidity as the environmental condition. The life detection device includes the computing means. The computing means is configured to compute the average humidity value. The life determination means is configured to determine the life of the encoder based on the cumulative total operating time and the average humidity value. Therefore, the life of the encoder can be determined based on the change in humidity of the usage environment of the encoder.

Then, the following is preferred. The computing means is configured to compute the average humidity value RHAVE. The life determination means is configured to calculate a life determination time H2 using the average humidity value RHAVE, a first constant B, and a second constant C by Equation (2) described in a first embodiment. The life determination time H2 is used by the life determination means for the determination. The life determination means is configured to determine the life of the component based on the life determination time H2 and the cumulative total operating time.

According to such a configuration, the life determination means is configured to calculate the life determination time H2 based on Equation (2). The life determination time H2 is used by the life determination means for the determination. The life determination means is configured to determine the life of the component based on the life determination time H2 and the cumulative total operating time. Therefore, the life determination means based on the change in humidity of the usage environment of the encoder can be easily mounted.

Then, the following is preferred. The environmental condition detection means includes: a current detection unit configured to detect a change in current in the component; a cumulative total time measurement unit configured to measure the cumulative total operating time of the encoder; and a cumulative total current measurement unit configured to measure a cumulative total current in the cumulative total operating time of the encoder. The life detection device includes computing means configured to compute an average current value using the cumulative total operating time and the cumulative total current. The life determination means is configured to determine the life of the component based on an average value based on the environmental condition detected by the environmental condition detection means, the average current value, and the cumulative total operating time.

According to such a configuration, the environmental condition detection means includes the current detection unit. The current detection unit is configured to detect the temperature and the humidity as the environmental condition. The current detection unit is configured to detect the change in current. The life detection device includes the computing means. The computing means is configured to compute the average current value as well as the average temperature value and the average humidity value. The life determination means is configured to determine the life of the encoder based on the cumulative total operating time and the average current value. Accordingly, the life of the encoder can be determined based on the environmental condition where the encoder is installed and the change in current. Therefore, the life determination means can determine the life at accuracy higher in the case where the life is determined using only the environmental condition.

Additionally, the following is preferred. The environmental condition detection means includes: an environment detection unit configured to detect a temperature, a humidity, and a current as the environmental condition as a detection result; a cumulative total time measurement unit configured to measure a cumulative total operating time of the encoder; and a cumulative total result measurement unit configured to measure a cumulative total result of the detection result detected by the environment detection unit in the cumulative total operating time. The life detection device includes: computing means configured to compute an average value of each of the temperature, the humidity, and the current using the cumulative total operating time and the cumulative total result; and storage means that stores a plurality of failure rate functions for calculating a failure rate of the encoder. The life determination means is configured to: extract an optimal failure rate function to calculate the failure rate from the plurality of failure rate functions stored in the storage means based on the average value and the cumulative total operating time; calculate the failure rate based on the optimal failure rate function and the cumulative total operating time; and determine the life of the component based on the failure rate.

Here, the failure rate function is a function indicating a relationship between the cumulative total operating time and the failure rate, and is the optimal failure rate function for calculating the failure rate.

According to such a configuration, the life detection device includes the storage means. The storage means stores the plurality of failure rate functions for calculating the failure rate of the encoder. The life determination means is configured to extract the optimal failure rate function based on the average value and the cumulative total operating time. The life determination means is configured to calculate the failure rate based on the optimal failure rate function and the cumulative total operating time. The life detection device extracts the approximate optimal failure rate function obtained from the average value among the plurality of failure rate functions stored in the storage means. Accordingly, compared with the case of using Equation (1) or Equation (2), the life detection device can easily calculate the failure rate and determine the life of the component.

Additionally, the following is preferred. The environmental condition detection means includes: an environment detection unit configured to detect a temperature, a humidity, and a current as the environmental condition as a detection result; a cumulative total time measurement unit configured to measure a cumulative total operating time of the encoder; and a cumulative total result measurement unit configured to measure a cumulative total result of the detection result detected by the environment detection unit in the cumulative total operating time. The life detection device includes: computing means configured to compute an average value of each of the temperature, the humidity, and the current using the cumulative total operating time and the cumulative total result; and a matrix calculation table to which the average value is inputtable. The average value is to derive an optimal failure rate function for calculating a failure rate of the encoder. The life determination means is configured to: calculate the failure rate based on the optimal failure rate function derived from the matrix calculation table and the cumulative total operating time; and determine the life of the component based on the failure rate.

According to such a configuration, even in a case where, for example, the life determination time cannot be computed using the above-described Equation (1) or Equation (2), or in a case where the optimal failure rate function cannot be extracted from the plurality of failure rate functions stored in the storage means, the life detection device for the encoder can easily derive the optimal failure rate function by the use of the matrix calculation table to which the average value is inputtable, thus ensuring determining the life of the component based on the failure rate.

Then, the following is preferred. The encoder is a photoelectric encoder including a light source, a scale, and light receiving means. The light source is configured to irradiate light. The scale has a graduation disposed along a measuring direction. The light receiving means is configured to receive the light irradiated from the light source via the scale. The components are the light source, the graduation of the scale, and the light receiving means.

According to such a configuration, the life detection device for the encoder can specifically determine the lives of the light source, the graduation of the scale, and the light receiving means as the components.

At this time, the following is preferred. The informing means is any of an alarm, light emitting means, and display means. The alarm is configured to inform the life based on the determination by the life determination means. The light emitting means is disposed outside the encoder. The display means is configured to display the life.

According to such a configuration, the life detection device for the encoder can inform the life by any of the alarm configured to inform the life based on the determination by the life determination means, the light emitting means disposed outside the encoder, and the display means configured to display the life. Therefore, the user can easily recognize the life of the component of the encoder.

At this time, the following is preferred. The environmental condition detection means is disposed inside the head.

According to such a configuration, the environmental condition detection means is disposed inside the head; therefore, the life of the component disposed inside the head can be efficiently determined.

At this time, the following is preferred. The environmental condition detection means is disposed inside the scale frame.

According to such a configuration, because the environmental condition detection means is disposed inside the scale frame, the lives of the components disposed inside the scale frame can be efficiently determined.

At this time, the following is preferred. The environmental condition detection means is disposed outside the encoder.

According to such a configuration, the environmental condition detection means is disposed outside the encoder; therefore, the life of the entire encoder, that is, all relevant components can be efficiently determined.

At this time, the following is preferred. The life detection device for the encoder includes communication means including an environment detection unit and a reception unit. The environment detection unit has a transmission function. The transmission function is configured to detect a state of at least any one of a temperature, a humidity, and a current and transmit a detection result of the state. The reception unit is configured to receive the detection result from the environment detection unit. The life determination means is configured to determine the life of the component constituting the encoder based on the detection result via the communication means.

According to such a configuration, the life detection device for the encoder includes the communication means; therefore, the life determination means can determine the life of the component in the encoder based on the detection result obtained via the communication means even in a case where the environmental condition detection means cannot be disposed at a desired position in the encoder.

BRIEF DESCRIPTION OF DRAWINGS

FIGS. 8A to 8C are diagrams illustrating matrix calculation tables in an encoder according to a third embodiment.

DESCRIPTION OF EMBODIMENTS

First Embodiment

The first embodiment of the invention will be described hereinafter based on FIG. 1A to FIG. 4.

FIGS. 1A and 1B are diagrams of an encoder 1 according to the first embodiment. Specifically, FIG. 1A is a diagram illustrating the entire encoder 1, and FIG. 1B is a cross-sectional view of the encoder 1 taken along A-A of FIG. 1A.

Figure 1:
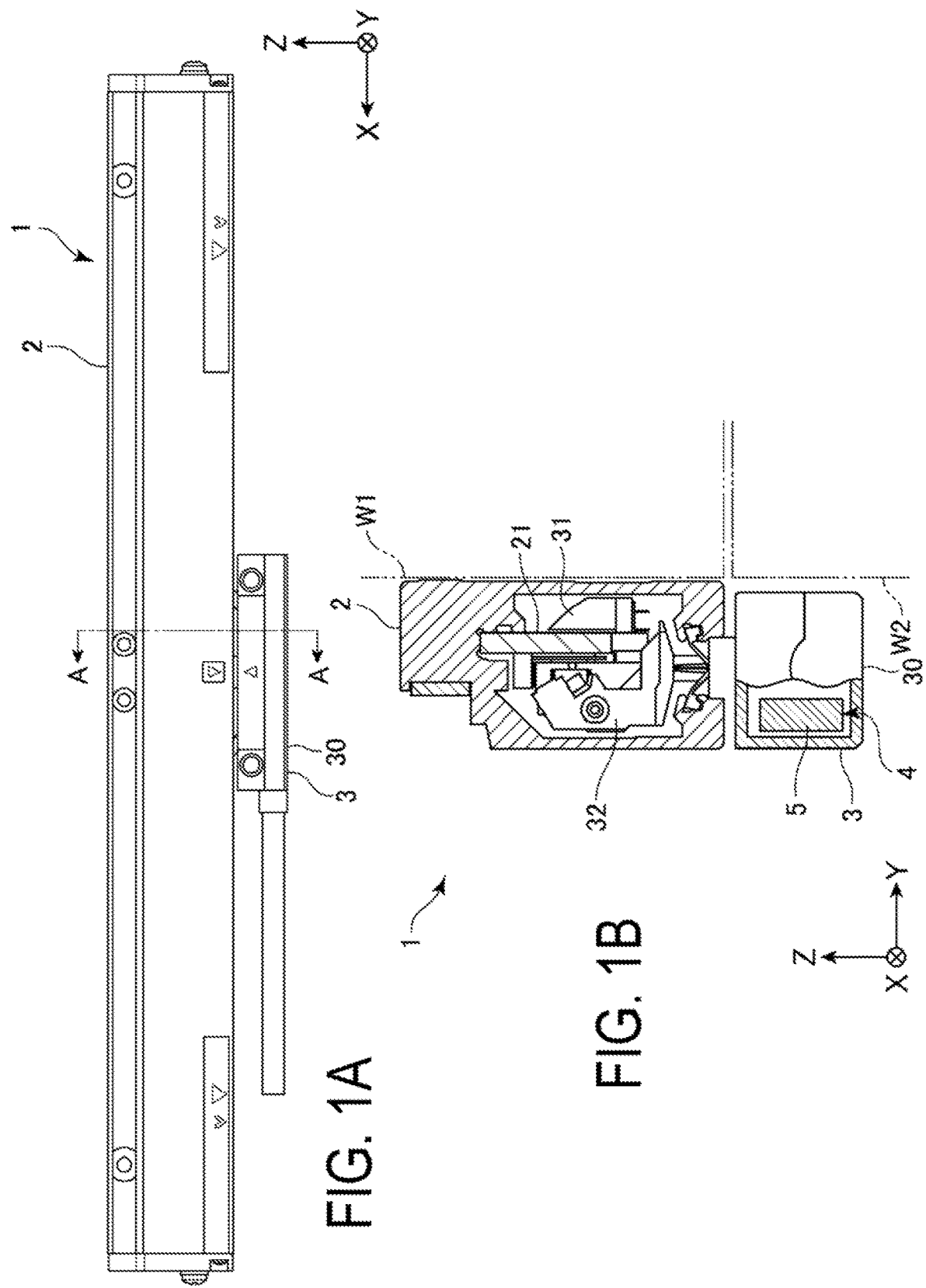
FIGS. 1A and 1B are diagrams illustrating an encoder according to a first embodiment.
Figure 2:
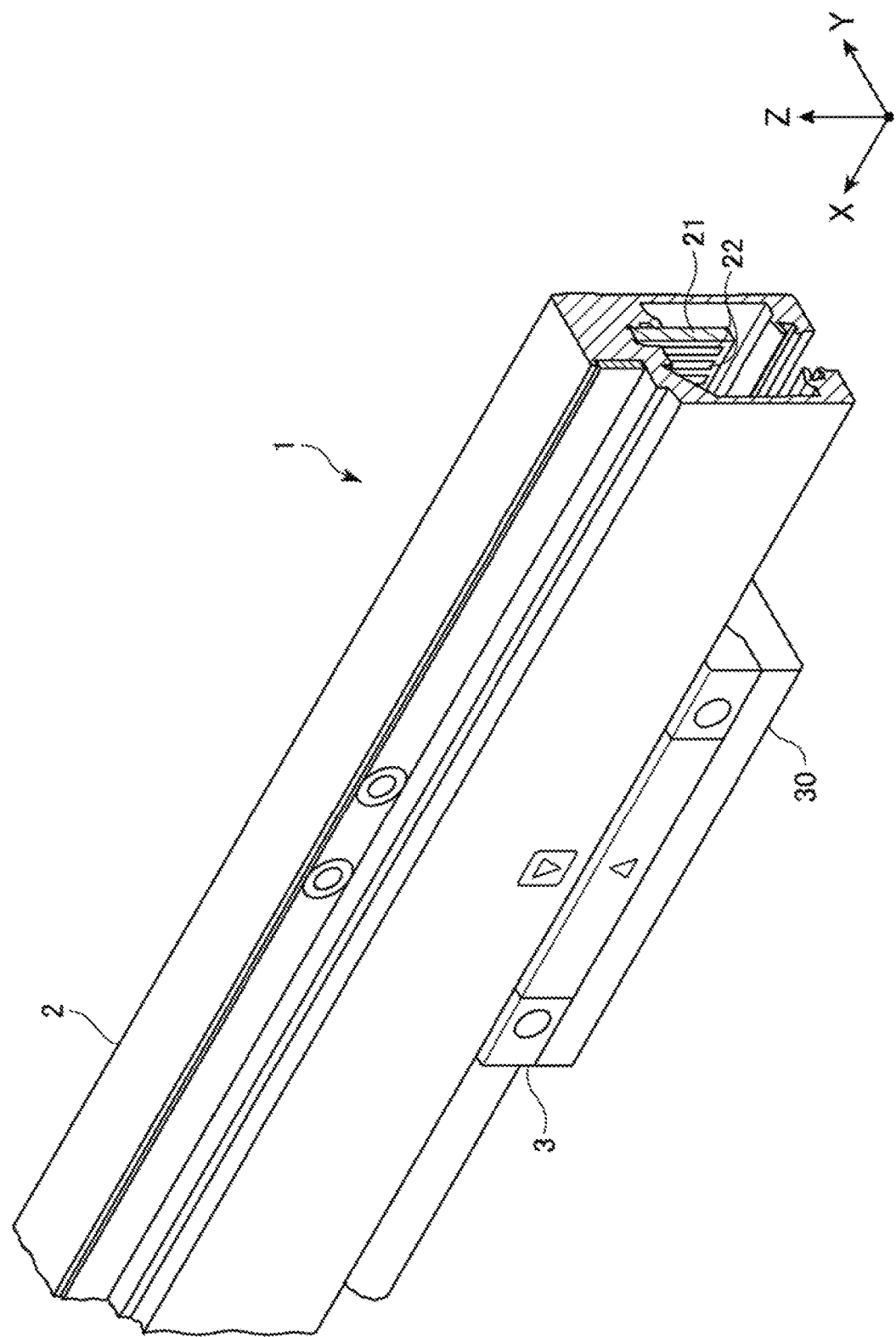
FIG. 2 is a perspective view illustrating the encoder.

FIG. 2 is a perspective view illustrating the encoder 1.

As illustrated in FIGS. 1A and 1B, the encoder 1 is a photoelectric linear encoder. The encoder 1 includes a scale 21 housed in a scale frame 2 and a head 3 that relatively moves along the scale 21 to detect an amount of relative movement with the scale 21. The encoder 1 includes a life detection device 4 that detects a life of a component of the encoder 1.

In the encoder 1, the head 3 is provided so as to be movable with respect to the long scale frame 2. The encoder 1 measures a moving distance between a pair of measured objects W1 and W2, the scale frame 2 is fixed to one measured object W1, and the head 3 is fixed to the other measured object W2.

As illustrated in FIG. 2, the scale 21 includes a scale base material made from a translucent material, such as a glass, and a graduation 22 formed on a surface of the scale base material and formed of an optical grating disposed at constant pitches along an X direction, which is a measurement direction.

The scale frame 2 is a material formed of aluminum alloy through extrusion molding, and is formed so as to have an overall hollow, substantially rectangular shape. The scale 21 is fixed to an interior of the scale frame 2. In the following descriptions and the respective drawings, a longitudinal direction of the scale frame 2 and also a measurement direction may be referred to as the X direction, a width direction (depth direction) of the scale frame 2 orthogonal to the X direction may be referred to as a Y direction, and a vertical direction orthogonal to the X and Y directions may be referred to as a Z direction.

The head 3 includes a head body 30 disposed outside the scale frame 2 and fixed to the other measured object W2. The head body 30 includes detection means disposed extending to the interior of the scale frame 2, and the detection means includes a light source 31 and light receiving means 32. The light source 31 is, for example, an LED and is disposed along one surface of the scale 21 to irradiate light. The light receiving means 32 is disposed along the other surface of the scale 21 and receives transmitted light that has been transmitted from the light source 31 through the scale 21. The head 3 generates an electrical signal based on the transmitted light received by the light receiving means 32 and receives the electrical signal by the head body 30 to detect the amount of relative movement with the scale 21. That is, the encoder 1 is a transmissive, photoelectric linear encoder.

Figure 3:
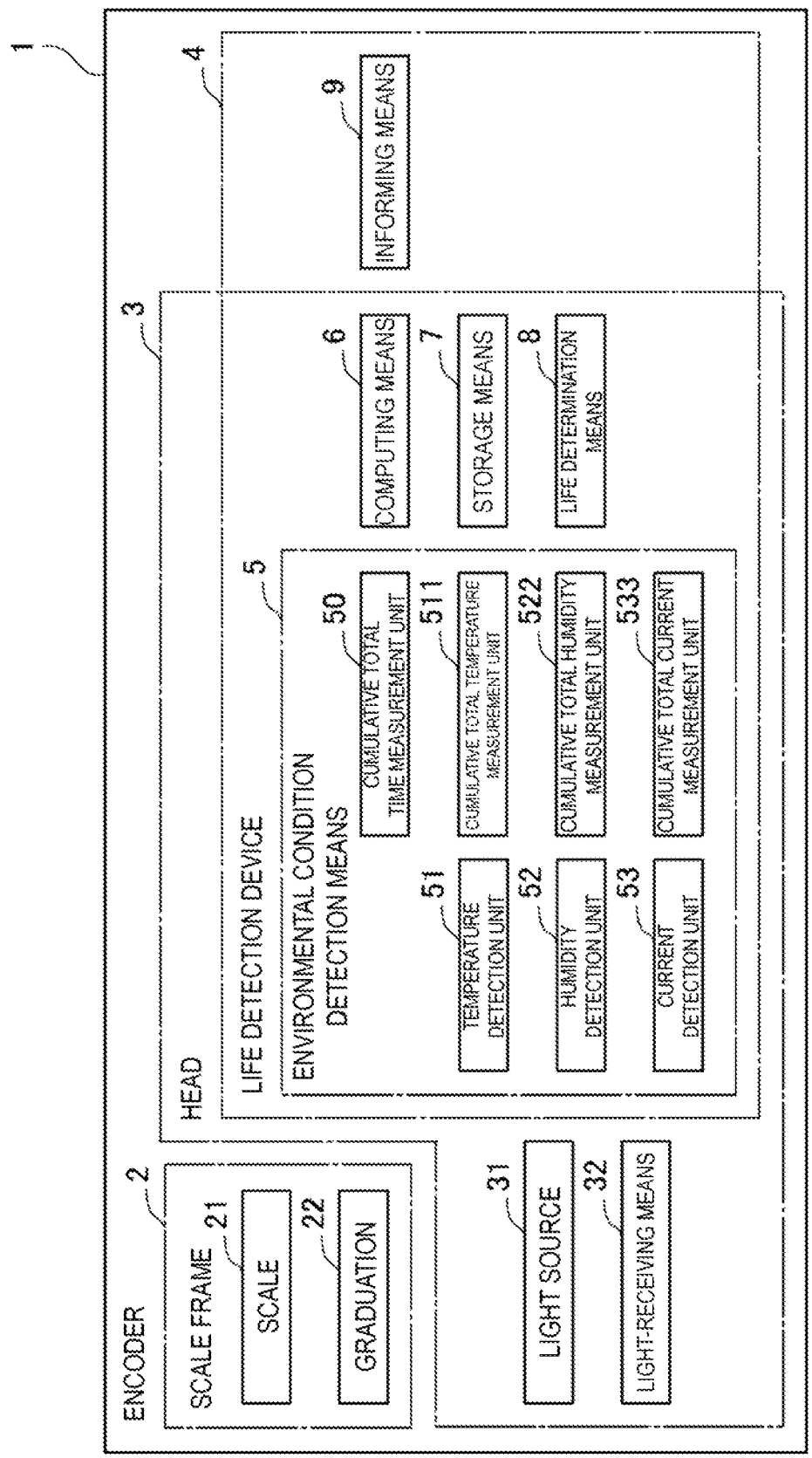
FIG. 3 is a block diagram illustrating a life detection device in the encoder.

FIG. 3 is a block diagram illustrating the life detection device 4 in the encoder 1.

As illustrated in FIG. 3, the life detection device 4 includes environmental condition detection means 5, computing means 6, storage means 7, life determination means 8, and informing means 9. As illustrated in FIG. 1B, the environmental condition detection means 5 in the life detection device 4 is disposed inside the head 3. Thus, the life detection device 4 detects the life of the component, such as a connection line and a substrate, related to the light source 31 and the light receiving means 32.

For example, when the encoder 1 is used in a high temperature and humidity environment, due to moisture in the air, metal parts of the connection line and the substrate exposed to the outside in the light source 31 and the light receiving means 32 corrode faster compared with a case where the encoder 1 is used in an appropriate environment. Therefore, the environmental condition detection means 5 is disposed inside the head 3, and thus the life of component related to the light source 31 and the light receiving means 32, such as the connection line and the substrate, can be accurately detected compared with a case where the environmental condition detection means 5 is disposed at another location.

The environmental condition detection means 5 detects an environmental condition related to the life detection in the encoder 1. The environmental condition detection means 5 includes a temperature detection unit 51 that detects a temperature, and a humidity detection unit 52 that detects a humidity, and further includes a current detection unit 53 that detects a change in current in the component, as the environmental conditions. The environmental condition detection means 5 includes a cumulative total time measurement unit 50 that measures a cumulative total operating time of the encoder 1, a cumulative total temperature measurement unit 511 that measures a cumulative total temperature in the cumulative total operating time, a cumulative total humidity measurement unit 522 that measures a cumulative total humidity in the cumulative total operating time, and a cumulative total current measurement unit 533 that measures a cumulative total current in the operating time of the encoder.

The computing means 6 computes an average temperature value, an average humidity value, and an average current value.

The informing means 9 informs the life of the encoder 1 based on the determination result by the life determination means 8. Specifically, the informing means 9 is display means (not illustrated) that displays the life based on the determination by the life determination means 8. The display means is, for example, a display, such as a liquid crystal or an organic EL, that displays a specific life of the component and presents the life to the user. Note that the informing means 9 needs not to be display means, and examples may include an alarm that informs the life and light emitting means, such as an LED, disposed outside the encoder 1. In the case of using the LED as the informing means 9, the LED includes, for example, a warning lamp informing that the life has become nearly over, and a life ramp informing that the life is at the end. The informing means 9 may inform a user of the life of the encoder 1 based on the determination result by the life determination means 8. In short, the informing means 9 may be any means as long as the informing means 9 can inform the user of the determination result by the life determination means 8.

Figures 4A, 4B, 4C, 4D, 4E, 4F:
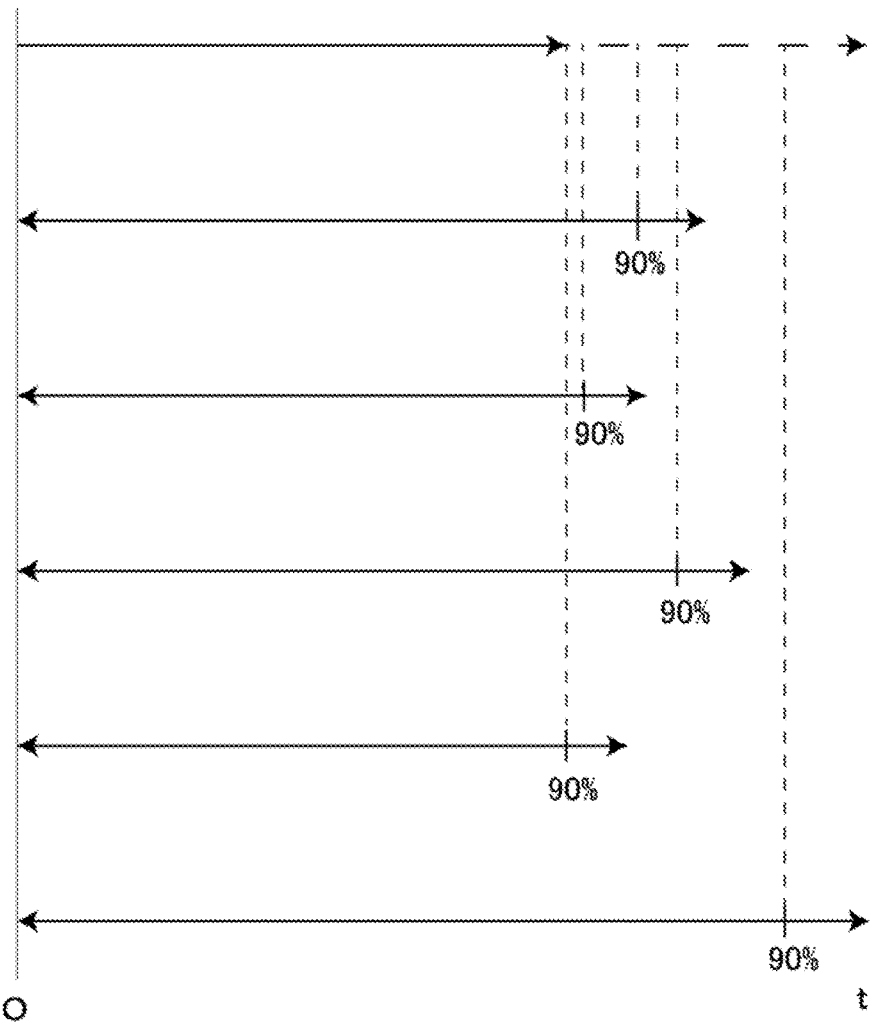
FIGS. 4A to 4F are a diagram illustrating life determination in the encoder.

FIGS. 4A to 4F are a diagram illustrating the life determination in the encoder 1. Specifically, FIG. 4A is a cumulative total operating time h by the cumulative total time measurement unit 50, FIG. 4B is a life determination time H1 of the component based on a temperature, FIG. 4C is a life determination time H2 of the component based on a humidity, FIG. 4D is a life determination time H3 of the component based on a current, and FIG. 4E is a life determination time H considering all of the temperature, the humidity, and the current together. FIG. 4F is a typical encoder lifetime M.

As illustrated in FIGS. 4A to 4F, in a conventional encoder, for example, the encoder lifetime M obtained from, for example, an empirical rule, is stored in, for example, storage means, such as a memory, in advance. The informing means 9 compared the cumulative total operating time h with the lifetime M, and when the cumulative total operating time h reached 90% of the lifetime M, the informing means 9 informed that the life of the encoder was over.

A method for determining the life of the encoder 1 according to the invention will be described below based on FIG. 4.

To determine the life of the component based on the temperature, the life detection device 4 first computes the average temperature value. The average temperature value is computed from the cumulative total operating time and the cumulative total temperature by the computing means 6.

Specifically, the computing means 6 computes an average temperature value TAVE, and the life determination means 8 calculates the life determination time H1 used for the determination from the average temperature value TAVE, a first constant B, and a second constant C by Equation (1).

[Math. 1]

$$H1 = e^{B/T_{AVE}} + C \qquad (1)$$

Then, as illustrated in FIGS. 4A and 4B, the life of the component is determined based on the life determination time H1 and the cumulative total operating time h. The informing means 9 informs the life of the encoder based on the determination by the life determination means 8.

Specifically, the life determination means 8 compares the life determination time H1 with the cumulative total operating time h, and in a case where the cumulative total operating time h reaches 90% of the life determination time H1, the life determination means 8 causes the informing means 9 to inform that the life of the encoder 1 is over.

To determine the life of the component based on the humidity, the life detection device 4 first computes the average humidity value. The average humidity value is computed from the cumulative total operating time and the cumulative total humidity by the computing means 6.

Specifically, the computing means 6 computes an average humidity value RHAVE, and the life determination means 8 calculates the life determination time H2 used for the determination from the average humidity value RHAVE, the first constant B, and the second constant C by Equation (2).

[Math. 2]

$$H2 = e^{B/RH_{AVE}} + C \qquad (2)$$

Then, as illustrated in FIGS. 4A and 4C, the life of the component is determined based on the life determination time H2 and the cumulative total operating time h. The informing means 9 informs the life of the encoder based on the determination by the life determination means 8.

Specifically, the life determination means 8 compares the life determination time H2 with the cumulative total operating time h, and in a case where the cumulative total operating time h reaches 90% of the life determination time H2, the life determination means 8 causes the informing means 9 to inform that the life of the encoder 1 is over.

To determine the life of the component based on the current, the life detection device 4 first computes the average current value. The average current value is computed from the cumulative total operating time and the cumulative total current by the computing means 6. The life determination means 8 calculates the life determination time H3 of the component based on the average current value and the cumulative total operating time. As illustrated in FIGS. 4A and 4D, the life determination means 8 determines the life of the component based on the life determination time H3 and the cumulative total operating time h. The informing means 9 informs the life of the encoder based on the determination by the life determination means 8.

Specifically, the life determination means 8 compares the life determination time H3 with the cumulative total operating time h, and in a case where the cumulative total operating time h reaches 90% of the life determination time H3, the life determination means 8 causes the informing means 9 to inform that the life of the encoder 1 is over.

While the life is determined from the life determination time H1, H2, or H3 based on each of the temperature, the humidity, and the current in FIGS. 4B to 4D, as illustrated in FIG. 4E, the life may be determined from the life determination time H considering all of the temperature, the humidity, and the current together.

In FIG. 4E, the life determination means 8 determines that the cumulative total operating time h reaches 90% of the life determination time H1 and causes the informing means 9 to inform that the life of the encoder 1 is over.

In addition, in FIGS. 4B to 4E, the values vary each time the computing means 6 calculates the respective average values, and the life determination means 8 compares the cumulative total operating time h at the time of the determination with the life determination times H and H1 to H3 and determines the life of the encoder 1.

Note that as a criterion for judgment in the first embodiment, the life determination means 8 compares the life determination time H or H1 to H3 with the cumulative total operating time h and performs the determination based on whether the cumulative total operating time h reaches 90% of the life determination time H or H1 to H3. However, the criterion need not necessary be 90%, and any value may be used as the criterion. In addition, the criterion for judgment needs not to be one, but a plurality of criteria for judgment may be used. For example, when the value reaches 70%, the informing means 9 is caused to inform a warning and when the value reaches 90%, the informing means 9 is caused to inform that the life is nearly over.

According to the first embodiment, the following actions and effects can be achieved.

(1) The life detection device 4 of the encoder 1 includes the environmental condition detection means 5 and the life determination means 8. The environmental condition detection means 5 is configured to detect the environmental condition related to the life detection in the encoder 1. The life determination means 8 is configured to determine the life of the component constituting the encoder 1 based on the detection result by the environmental condition detection means 5. Accordingly, the life can be determined based on the usage environment where the encoder 1 is placed, as well as the change in current. Accordingly, the life detection device 4 of the encoder 1 can determine the life of the encoder 1 based on the environmental condition of the usage environment of the encoder 1.

(2) The environmental condition detection means 5 includes the temperature detection unit 51. The temperature detection unit 51 is configured to detect the temperature as the environmental condition. The life detection device 4 includes the computing means 6. The computing means 6 is configured to compute the average temperature value TAVE. The life determination means 8 is configured to determine the life of the encoder based on the cumulative total operating time h and the average temperature value TAVE.

Accordingly, the life of the encoder 1 can be determined based on the change in temperature of the usage environment of the encoder 1.

(3) The life determination means 8 is configured to calculate the life determination time H1 based on Equation (1). The life determination means 8 is configured to determine the life of the component based on the life determination time H1 and the cumulative total operating time h. Therefore, the life determination means based on the change in temperature of the usage environment of the encoder 1 can be easily mounted.

(4) The environmental condition detection means 5 includes the humidity detection unit 52. The humidity detection unit 52 is configured to detect the humidity as the environmental condition. The life detection device 4 includes the computing means 6. The computing means 6 is configured to compute the average humidity value RHAVE. The life determination means 8 is configured to determine the life of the encoder 1 based on the cumulative total operating time h and the average humidity value RHAVE. Therefore, the life of the encoder 1 can be determined based on the change in humidity of the usage environment of the encoder 1.

(5) The life determination means 8 is configured to calculate the life determination time H2 based on Equation (2). The life determination means 8 is configured to determine the life of the component based on the life determination time H2 and the cumulative total operating time h. Therefore, the life determination means based on the change in humidity of the usage environment of the encoder 1 can be easily mounted.

(6) The environmental condition detection means 5 includes the current detection unit 53. The current detection unit 53 is configured to detect the temperature and the humidity as the environmental condition. The current detection unit 53 is configured to detect the change in current. The life detection device 4 includes the computing means 6. The computing means 6 is configured to compute the average current value as well as the average temperature value TAVE and the average humidity value RHAVE. The life determination means 8 is configured to determine the life of the encoder 1 based on the cumulative total operating time h and the average current value. Accordingly, the life of the encoder 1 can be determined based on the environmental condition where the encoder 1 is installed and the change in current. Therefore, the life determination means 8 can determine the life at accuracy higher in the case where the life is determined using only the environmental condition.

(7) The life detection device 4 of the encoder 1 can specifically determine the lives of, for example, the connection line and the substrate related to the light source 31 and the light receiving means 32 as the components.

(8) The life detection device 4 of the encoder 1 can display and inform the life by the display means. The display means is configured to inform the life based on the determination by the life determination means 8. Accordingly, the user can easily recognize the life of the component of the encoder 1.

(9) The environmental condition detection means 5 is disposed inside the head 3. Accordingly, the lives of, for example, the connection line and the substrate related to the light source 31 and the light receiving means 32, which are the components disposed inside the head 3, can be efficiently determined.

Second Embodiment

The second embodiment of the invention will be described hereinafter based on FIG. 5 to FIG. 7C.

Note that in the following descriptions, parts that have already been described will be given the same reference signs, and descriptions thereof will be omitted.

Figure 5:
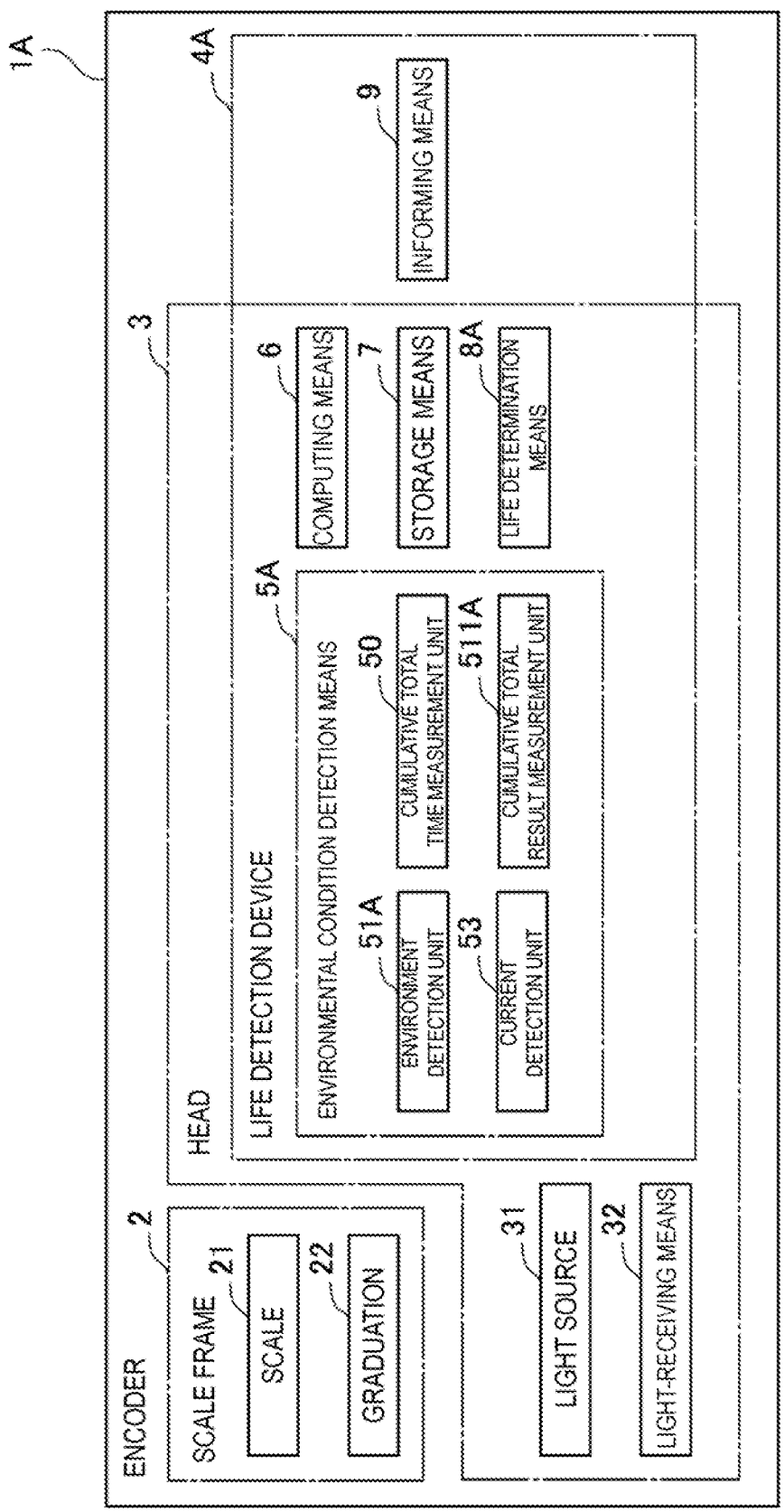
FIG. 5 is a block diagram illustrating a life detection device in an encoder according to a second embodiment.

FIG. 5 is a block diagram illustrating a life detection device 4A in an encoder 1A according to the second embodiment.

In the first embodiment, the life detection device 4 in the encoder 1 includes the environmental condition detection means 5, the computing means 6, the storage means 7, the life determination means 8, and the informing means 9. The environmental condition detection means 5 includes the cumulative total time measurement unit 50, the temperature detection unit 51, the humidity detection unit 52, the current detection unit 53, the cumulative total temperature measurement unit 511, the cumulative total humidity measurement unit 522, and the cumulative total current measurement unit 533. The life determination means 8 calculates the life determination times H1 and H2 based on Equation (1) and Equation (2) and determines the life of the component of the encoder 1 based on the life determination time H or H1 to H3 and the cumulative total operating time h.

As illustrated in FIG. 5, the second embodiment differs from the first embodiment in the following points. The life detection device 4A in the encoder 1A includes an environment detection unit 51A that detects states of a temperature and a humidity and a cumulative total result measurement unit 511A that measures cumulative total detection results by the environment detection unit 51A and the current detection unit 53. Life determination means 8A stores a plurality of failure rate functions as prescribed function graphs for each combination of a plurality of parameters by the environment detection unit 51A, the current detection unit 53, and the cumulative total result measurement unit 511A in the storage means 7. The life determination means 8A calculates a failure rate of the encoder 1A based on the plurality of failure rate functions and determines a life of the encoder 1A based on the failure rate. Note that the failure rate function is a function indicative of a relationship between the cumulative total operating time and the failure rate.

Figure 6:
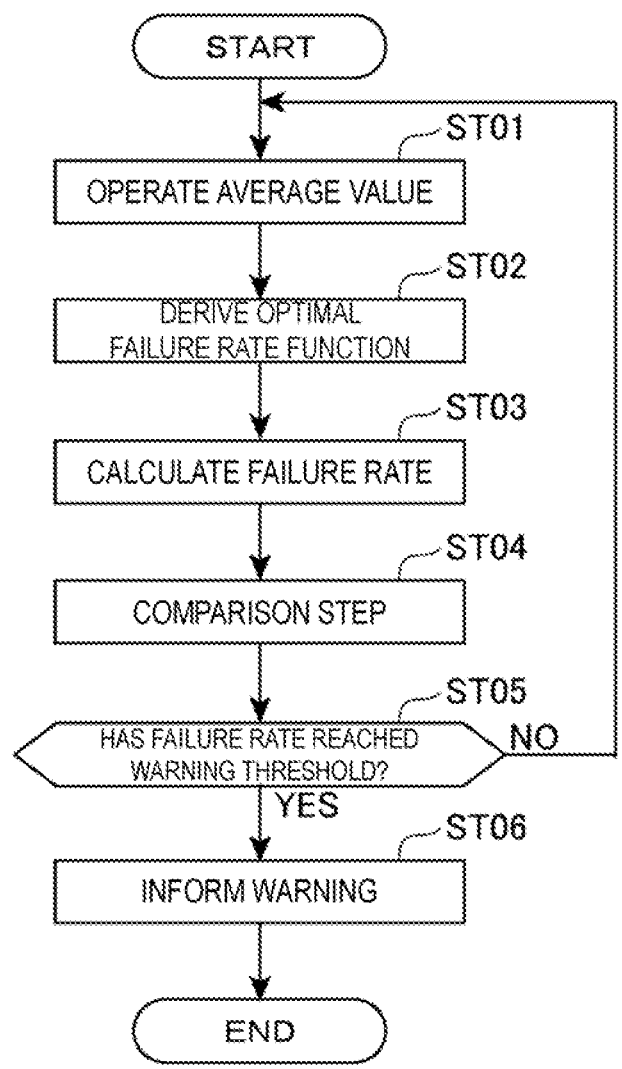
FIG. 6 is a flowchart depicting a method for determining a life in the encoder.

FIG. 6 is a flowchart depicting a method for determining the life in the encoder 1A.

The life determination method by the life detection device 4A in the encoder 1A will be described below based on FIG. 6.

As depicted in FIG. 6, first, the computing means 6 computes an average value based on a result by the cumulative total result measurement unit 511A (Step ST01). Next, the life determination means 8A extracts the failure rate function to calculate the failure rate of the encoder 1A (Step ST02). When the failure rate function is extracted, the life determination means 8A substitutes the cumulative total operating time h for the extracted failure rate function and calculates the failure rate of the encoder 1A (Step ST03). Here, the life determination means 8A has a warning threshold in advance to inform the informing means 9 that the life of the encoder 1A is over. The life determination means 8A performs a comparison step of comparing the warning threshold with the failure rate (Step ST04). When the life determination means 8A determines that the failure rate reaches the warning threshold (YES at Step ST05), the life determination means 8A causes the informing means 9 to inform that the life of the encoder 1A is over. When the life determination means 8A determines that the failure rate does not reach the warning threshold (NO at Step ST05), the life determination means 8A returns to Step ST01 and repeats the determination until the failure rate reaches the warning threshold.

Here, the warning threshold includes a first warning threshold (Warning) that informs the user of the life shortly before the life of the encoder 1A ends and a second warning threshold (Alarm) that informs the user that the life of the encoder 1A has ended. Note that only a single warning threshold may be set or a plurality of warning thresholds may be set. In short, as long as the informing means 9 can perform information based on the warning threshold, the number of warning thresholds may be any given number.

Figure 7A:
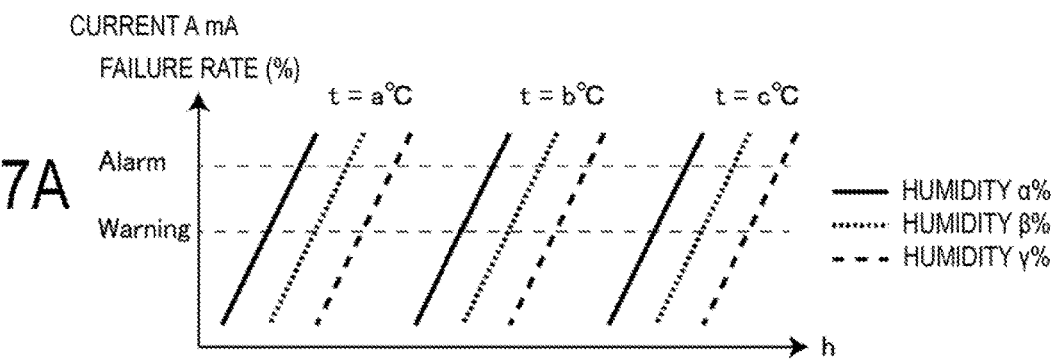
FIGS. 7A to 7C are graphs showing life determination by life determination means of a life detection device in the encoder.
Figure 7B:
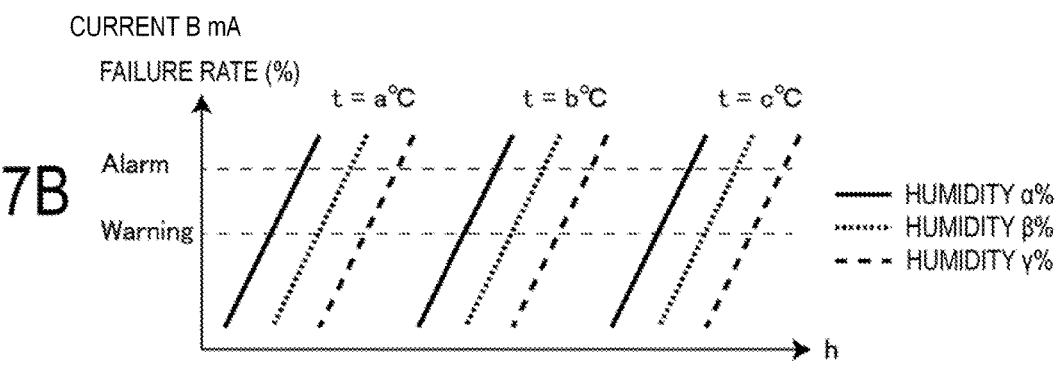
Figure 7C:
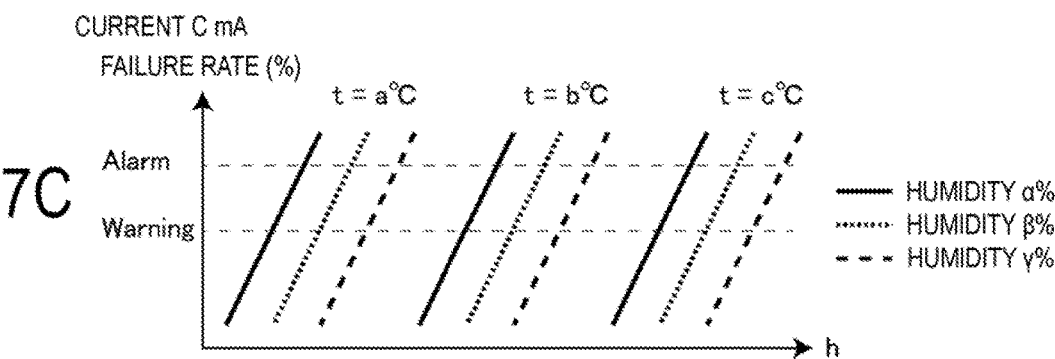

FIGS. 7A to 7C are graphs showing the life determination by the life determination means 8A of the life detection device 4A in the encoder 1A. Specifically, FIGS. 7A to 7C are three-dimensional graphs plotting the failure rate on the vertical axis, the cumulative total operating time h on the horizontal axis, and the current on an axis in a direction where the vertical axis is orthogonal to the horizontal axis. For convenience of description, the graphs are shown by being separated for each current. FIG. 7A illustrates a case of A mA, FIG. 7B illustrates a case of B mA, and FIG. 7C illustrates a case of C mA. A method for extracting the failure rate function of the encoder 1A in Step ST02 described above will be described based on FIGS. 7A to 7C.

The life detection device 4A stores the plurality of failure rate functions, which are the prescribed function graphs for each combination of the plurality of parameters by the environment detection unit 51A and the cumulative total result measurement unit 511A, in the storage means 7. The life determination means 8A extracts the failure rate function as illustrated in FIGS. 7A to 7C according to the parameter approximation to the value computed by the computing means 6 from the storage means 7. As illustrated in FIGS. 7A to 7C, the extracted failure rate function is treated as an optimal failure rate function, and the cumulative total operating time h is substituted for the optimal failure rate function to calculate the failure rate.

As a result, the life determination means 8A can extract the optimal failure rate function according to the parameter among the plurality of failure rate functions and calculate the failure rate. Then, the life of the encoder 1A is determined by the failure rate and the cumulative total operating time h. When the determination result reaches the first warning threshold (Warning), the informing means 9 is caused to inform the user that the life of the encoder 1A is nearly over. When the determination result reaches the second warning threshold (Alarm), the informing means 9 is caused to inform the user that the life of the encoder 1A has ended.

According to the second embodiment as well, the following actions and effects can be achieved in addition to the actions and effects similar to (1) and (7) to (9) in the first embodiment.

(10) The life detection device 4A includes the storage means 7. The storage means 7 stores the plurality of failure rate functions for calculating the failure rate of the encoder 1A. The life determination means 8A is configured to extract the optimal failure rate function based on the average value and the cumulative total operating time h. The life determination means 8A is configured to calculate the failure rate based on the optimal failure rate function and the cumulative total operating time h. The life detection device 4A extracts the approximate optimal failure rate function obtained from the average value among the plurality of failure rate functions stored in the storage means 7. Accordingly, compared with the case of using Equation (1) or Equation (2), the life detection device 4A can easily calculate the failure rate and determine the life of the component.

Third Embodiment

The third embodiment of the invention will be described hereinafter based on FIGS. 8A to 8C.

Note that in the following descriptions, parts that have already been described will be given the same reference signs, and descriptions thereof will be omitted.

FIGS. 8A to 8C are diagrams illustrating matrix calculation tables in the encoder 1A according to the third embodiment.

In the second embodiment, the life determination means 8A of the life detection device 4A in the encoder 1A has calculated the failure rate based on the plurality of failure rate functions stored in the storage means 7 and has determined the life of the encoder 1A based on the failure rate and the cumulative total operating time h.

The third embodiment differs from the second embodiment in the following points. The life detection device 4A stores a mathematical formula that generally represents a failure rate function in the storage means 7 and stores the matrix calculation table storing coefficients used in mathematical formula stored in the storage means 7 for each combination of parameters. The life determination means 8A calculates the failure rate using the mathematical formula stored in the storage means 7 and the matrix calculation table and determines the life of the encoder 1A based on the failure rate and the cumulative total operating time h. That is, the third embodiment differs from the second embodiment in the method of extracting the optimal failure rate function at Step ST02 of the second embodiment in FIG. 6.

A method for deriving a function for calculating the failure rate of the encoder 1A at Step ST02 (see FIG. 6) described above will be described based on FIGS. 8A to 8C.

The life detection device 4A stores the mathematical formula that generally represents the failure rate function in the storage means 7 and stores the matrix calculation table, which is illustrated in FIGS. 8A to 8C, that stores the coefficients used for the mathematical formulas stored in the storage means 7 for each combination of the parameters. The life determination means 8A derives an optimal failure rate function based on the mathematical formula stored in the storage means 7 and an average value computed by the computing means 6.

When a coefficient at a parameter value corresponding to the average value computed by the computing means 6 is not stored in the matrix calculation table, a coefficient at a parameter value corresponding to the value computed by the computing means 6 may be obtained by supplementation using coefficients at a plurality of parameters close to the value computed by the computing means 6.

When the optimal failure rate function is derived, the life determination means 8A substitutes the cumulative total operating time h for the optimal failure rate function and calculates the failure rate. Then, the life of the encoder 1A is determined by the failure rate and the cumulative total operating time h. When the determination result reaches the first warning threshold (Warning), the informing means 9 is caused to inform the user that the life of the encoder 1A is nearly over. When the determination result reaches the second warning threshold (Alarm), the informing means 9 is caused to inform the user that the life of the encoder 1A has ended.

According to the third embodiment as well, the following actions and effects can be achieved in addition to the actions and effects similar to (1) and (7) to (9) in the first embodiment.

(11) Even in a case where, for example, the life determination time H or H1 to H3 cannot be computed using the above-described Equation (1) or Equation (2), or in a case where the optimal failure rate function cannot be extracted from the plurality of failure rate functions stored in the storage means 7, the life detection device 4A of the encoder 1A can easily derive the optimal failure rate function by the use of the matrix calculation table to which the average value is inputtable, thus ensuring determining the life of the component based on the failure rate.

Fourth Embodiment

The fourth embodiment of the invention will be described hereinafter based on FIG. 9 and FIG. 10.

Note that in the following descriptions, parts that have already been described will be given the same reference signs, and descriptions thereof will be omitted.

Figure 9:
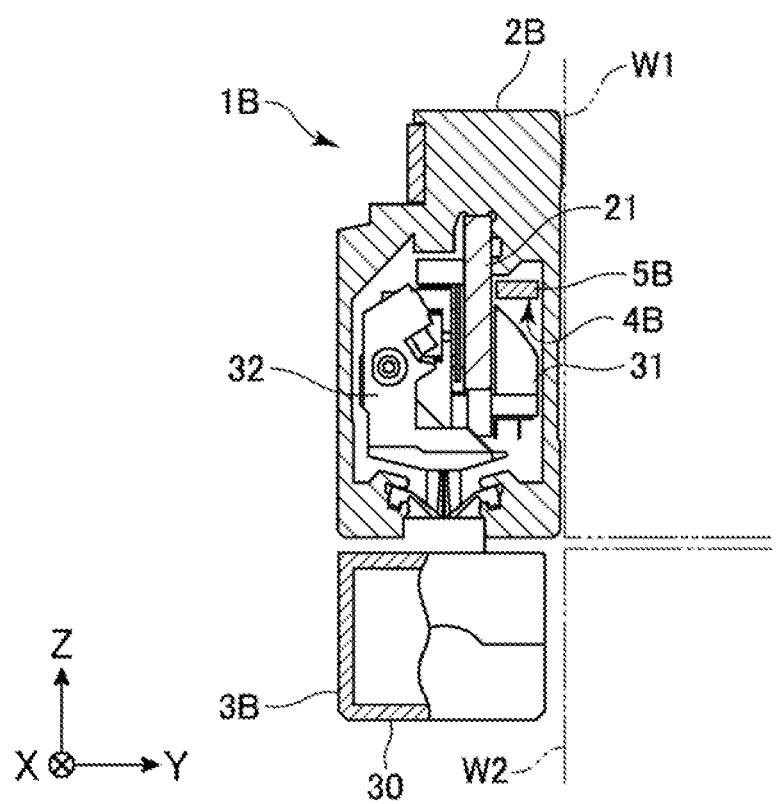
FIG. 9 is a cross-sectional view illustrating an arrangement of a life detection device in an encoder according to a fourth embodiment.
Figure 10:
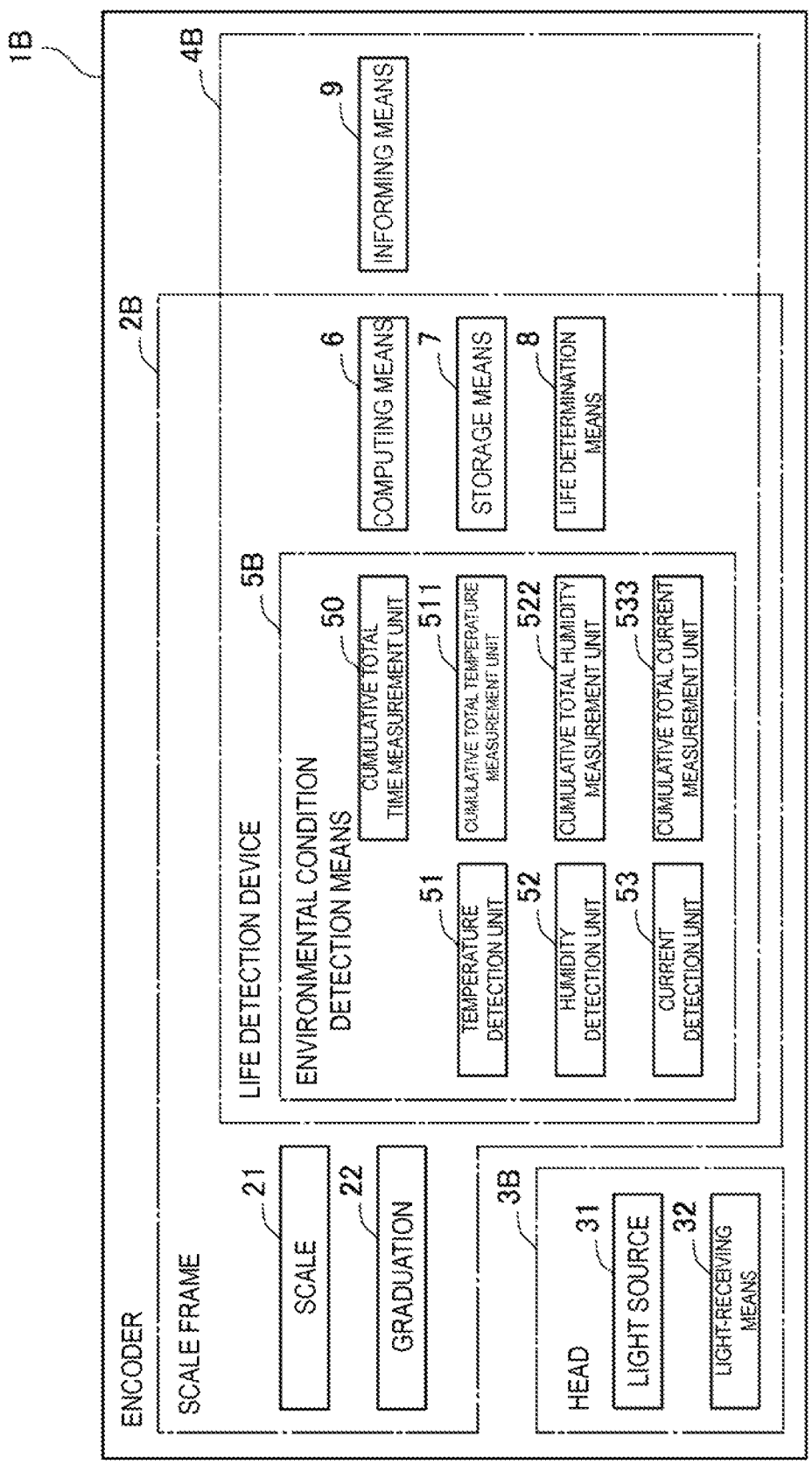
FIG. 10 is a block diagram illustrating the life detection device in the encoder.

FIG. 9 is a cross-sectional view illustrating an arrangement of a life detection device 4B in an encoder 1B according to the fourth embodiment, and FIG. 10 is a block diagram illustrating the life detection device 4B in the encoder 1B.

In the first embodiment, the environmental condition detection means 5 of the life detection device 4 in the encoder 1 has been disposed inside the head 3.

The fourth embodiment differs from the first embodiment in that an environmental condition detection means 5B of the life detection device 4B in the encoder 1B is disposed inside a scale frame 2B.

As illustrated in FIG. 9 and FIG. 10, the environmental condition detection means 5B is disposed inside the scale frame 2B, and thus the life detection device 4B can detect the lives of the graduation 22, the light source 31, and the light receiving means 32.

Because the graduation 22 formed from the optical grating is a considerably fine slit; for example, when the encoder 1B is used in a high temperature and humidity environment, dust is likely to adhere to the slit due to moisture in the air. When dust adheres, an amount of light transmitted from the light source 31 via the graduation 22 decreases, possibly resulting in decrease in the detection accuracy of the light receiving means 32. In addition, for example, the adhesion of dust to a surface of a light emitting portion provided with the light source 31 due to moisture in the air also decreases the amount of light, resulting in deterioration. Furthermore, similarly, the adhesion of dust to a light-receiving surface of the light receiving means 32 decreases an amount of received light, possibly promoting the deterioration and decreasing the detection accuracy. Therefore, the environmental condition detection means 5B is disposed inside the scale frame 2B, and thus the lives of the graduation 22, the light source 31, and the light receiving means 32 can be detected accurately compared with a case where the environmental condition detection means 5B is disposed at another location.

According to the fourth embodiment as well, the following actions and effects can be achieved in addition to the actions and effects similar to (1) to (6), (8), and (9) in the first embodiment.

(12) Because the environmental condition detection means 5B is disposed inside the scale frame 2B, the lives of the graduation 22 of the scale 21, the light source 31, and the light receiving means 32, which are the components disposed inside the scale frame 2B, can be efficiently determined.

Fifth Embodiment

The fifth embodiment of the invention will be described hereinafter based on FIG. 11 and FIG. 12.

Note that in the following descriptions, parts that have already been described will be given the same reference signs, and descriptions thereof will be omitted.

Figure 11:
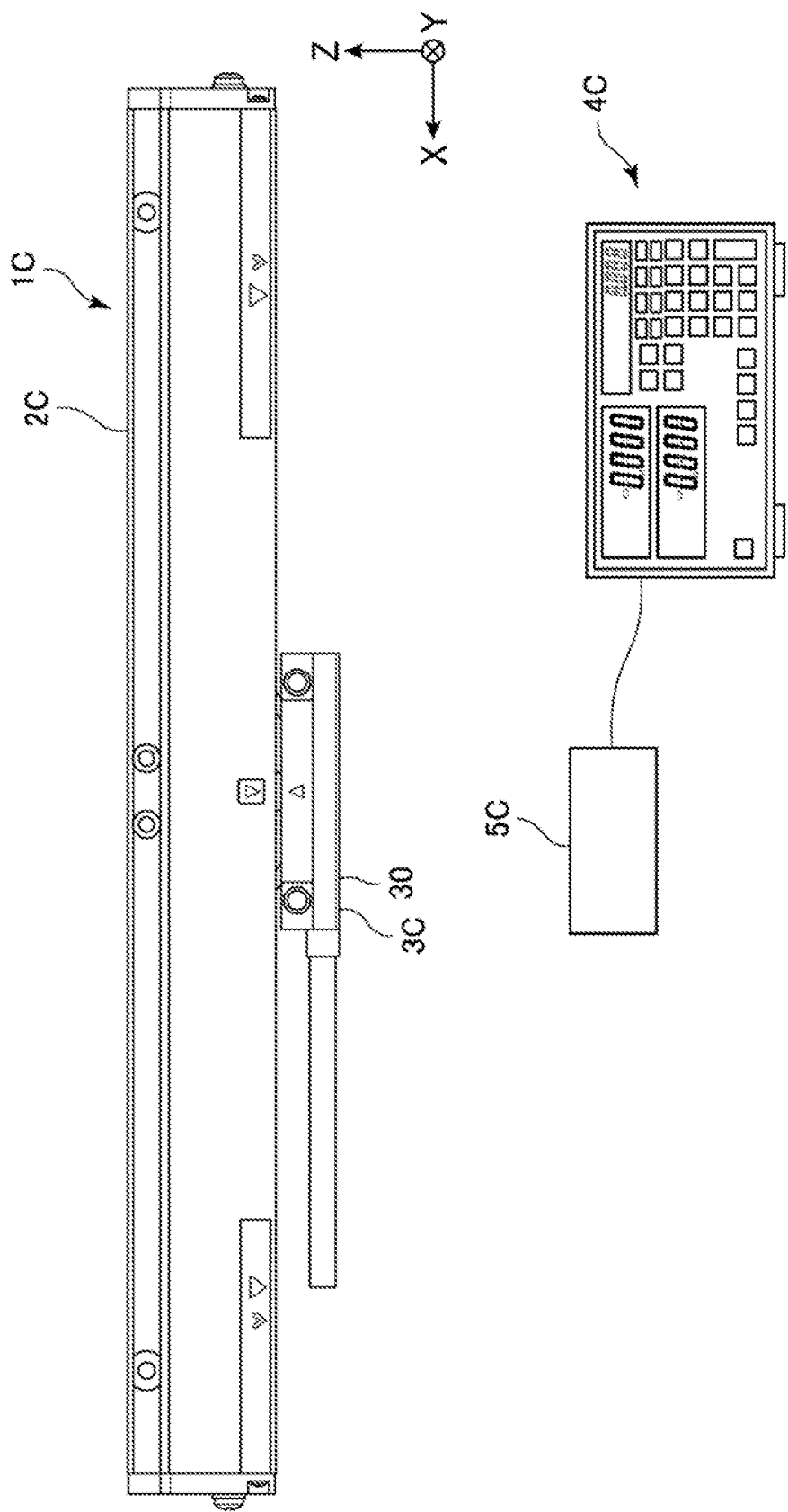
FIG. 11 is a diagram illustrating an arrangement of a life detection device in an encoder according to a fifth embodiment.
Figure 12:
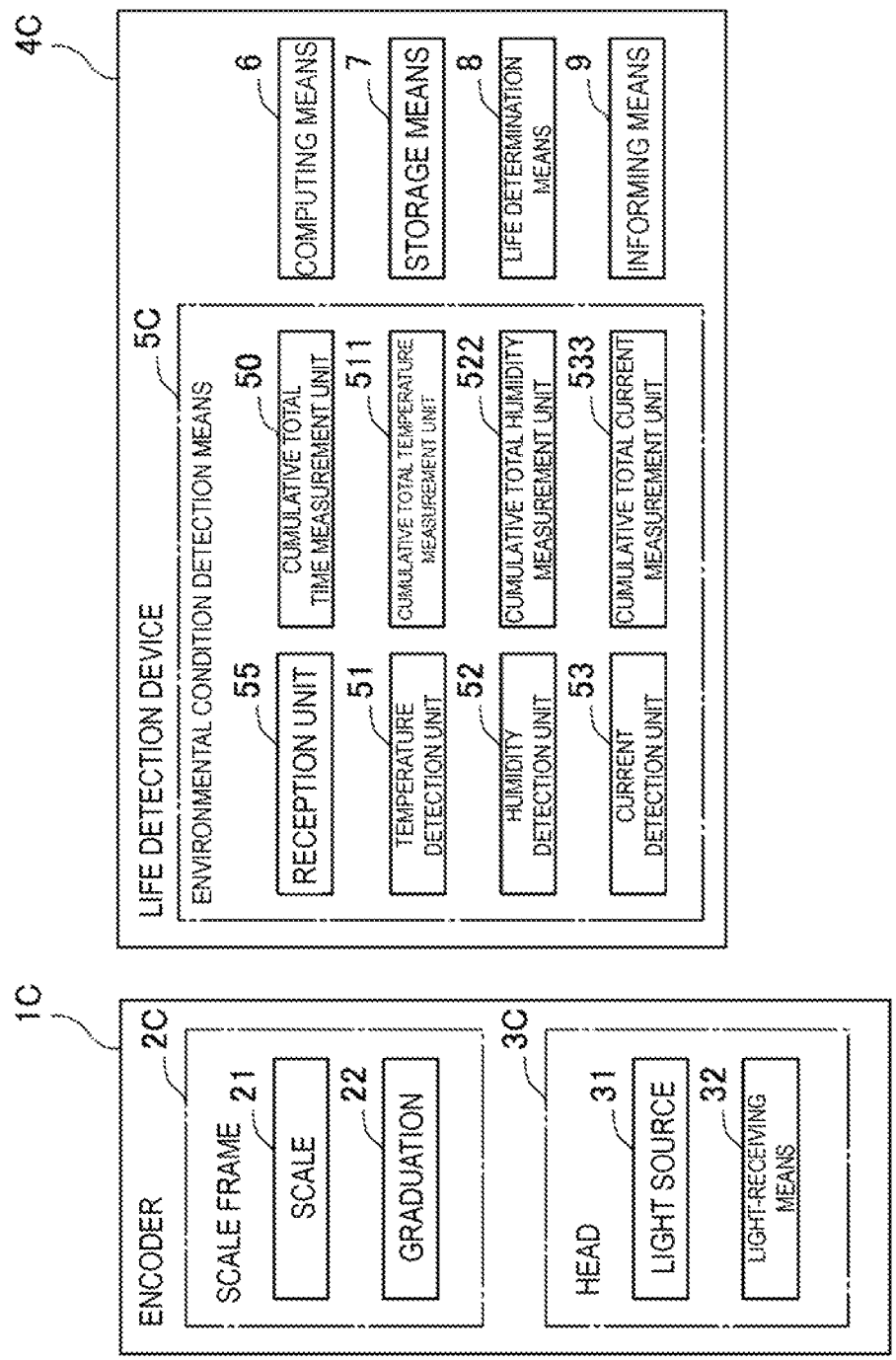
FIG. 12 is a block diagram illustrating the life detection device in the encoder.

FIG. 11 is a cross-sectional view illustrating an arrangement of a life detection device 4C in an encoder 1C according to the fifth embodiment, and FIG. 12 is a block diagram illustrating the life detection device 4C in the encoder 1C.

In the first embodiment, the environmental condition detection means 5 of the life detection device 4 in the encoder 1 has been disposed inside the head 3, and in the fourth embodiment, the environmental condition detection means 5B of the life detection device 4B in the encoder 1B has been disposed inside the scale frame 2B.

The fifth embodiment differs from the first and fourth embodiments in that environmental condition detection means 5C of the life detection device 4C in the encoder 1C is disposed outside the encoder 1C as illustrated in FIG. 11 and FIG. 12.

According to the fifth embodiment as well, the following actions and effects can be achieved in addition to the actions and effects similar to (1) to (6), (8), and (9) in the first embodiment.

(13) The environmental condition detection means 5C is disposed outside the encoder 1C; therefore, the life of the entire encoder 1C, that is, all components relevant to the life determination can be efficiently determined.

Sixth Embodiment

The sixth embodiment of the invention will be described hereinafter based on FIG. 13.

Note that in the following descriptions, parts that have already been described will be given the same reference signs, and descriptions thereof will be omitted.

Figure 13:
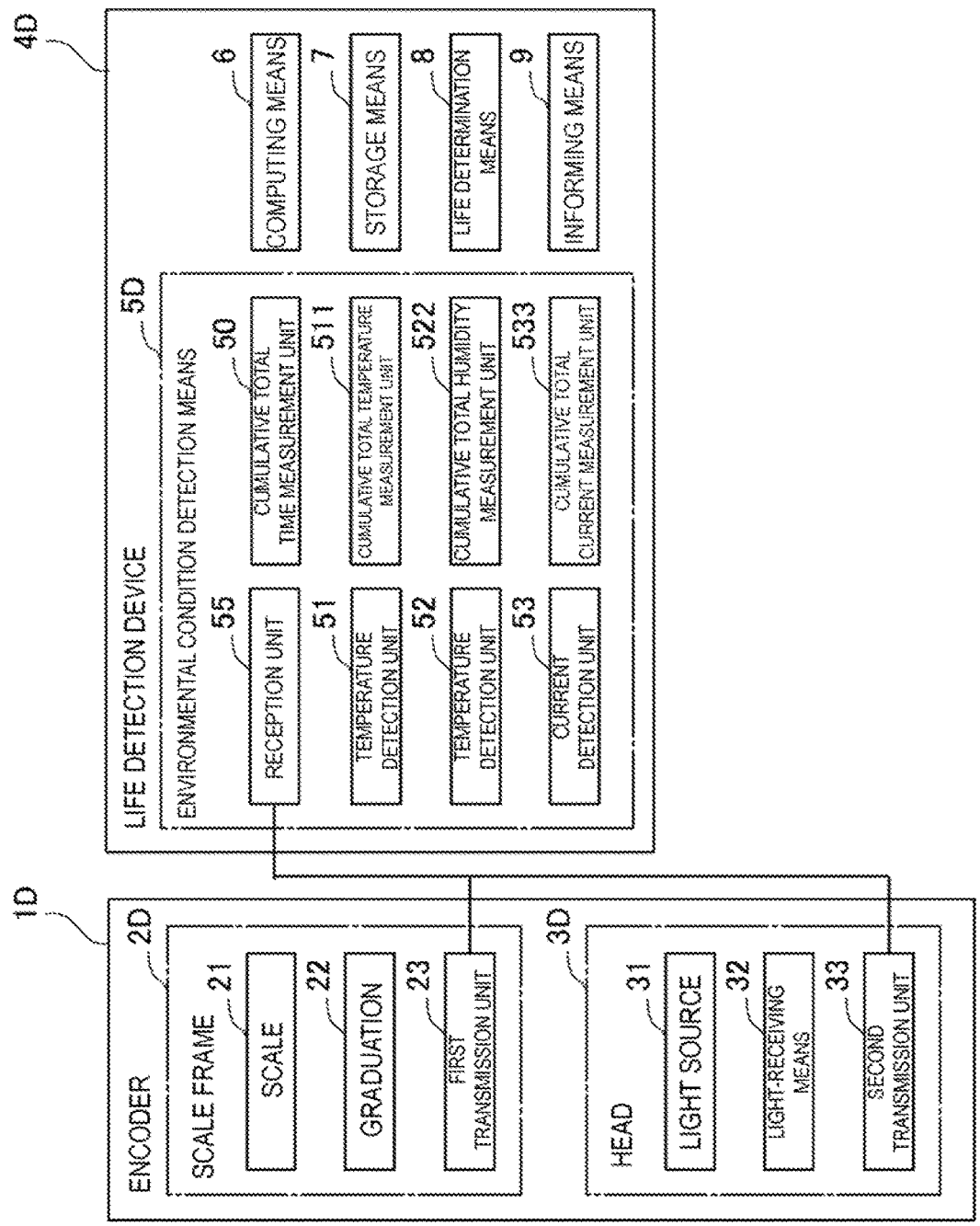
FIG. 13 is a block diagram illustrating a life detection device in an encoder according to a sixth embodiment.

FIG. 13 is a block diagram illustrating a life detection device 4D in an encoder 1D.

In the fifth embodiment, the environmental condition detection means 5C of the life detection device 4C in the encoder 1C has been disposed outside the encoder 1C.

The sixth embodiment differs from the fifth embodiment in the following points. As illustrated in FIG. 13, the life detection device 4D in the encoder 1D includes communication means including environment detection units 51D, 52D and a reception unit 55. The environment detection units 51D, 52D have a transmission function. The transmission function is configured to detect a state of at least any one of a temperature, a humidity, and a current and transmits a detection result of the state. The reception unit 55 is configured to receive the detection result from the environment detection units 51D, 52D. The life determination means 8 is configured to determine the life of the component constituting the encoder 1D via the communication means.

Specifically, the communication means includes a first environment detection unit 51D disposed inside a scale frame 2D, a second environment detection unit 52D disposed inside a head 3D, and the reception unit 55 disposed inside the environmental condition detection means 5D and receives detection results transmitted from the first environment detection unit 51D and the second environment detection unit 52D. The first environment detection unit 51D and the second environment detection unit 52D detect states of a temperature, a humidity, and a current. The detection results detected by the first environment detection unit 51D and the second environment detection unit 52D are transmitted to the reception unit 55. A cumulative total temperature measurement unit 511, a cumulative total humidity measurement unit 522, and a cumulative total current measurement unit 533 measure cumulative totals of the respective states based on the detection results received by the reception unit 55.

The transmission and reception of the first environment detection unit 51D and the second environment detection unit 52D with the reception unit 55 are wirelessly performed. Note that the communication means may be wired, not wireless, and any means may be used as long as the first environment detection unit 51D and the second environment detection unit 52D can communicate with the reception unit 55.

According to the sixth embodiment as well, the following actions and effects can be achieved in addition to the actions and effects similar to the fifth embodiment.

(14) The life detection device 4D of the encoder 1D includes the communication means; therefore, the life determination means 8 can determine the life of the component in the encoder 1D based on the detection results obtained via the communication means even in a case where the environmental condition detection means 5D cannot be disposed at a desired position in the encoder 1D.

Variations on Embodiments

Note that the invention is not limited to the foregoing embodiments, and, for example, variations and improvements that fall within a scope in which the object of the invention can be achieved are also included within the invention.

For example, in the respective embodiments, while the encoders 1 and 1A to 1D are the transmission-type photoelectric linear encoders, they may be reflection-type photoelectric linear encoders. They may be rotary encoders, not the photoelectric linear encoders. In short, as long as the encoder includes the scale housed in the scale frame and the head that relatively moves along the scale and detects the amount of relative movement with the scale, any detection method or configuration may be employed.

In the first embodiment and the fourth to the sixth embodiments, while the life determination means 8 determines the life using the life determination times H and H1 to H3 calculated based on Equation (1) and Equation (2), the life may be determined using the function graph in the second embodiment and the matrix calculation table in the third embodiment. In addition, in the first embodiment and the fourth to the sixth embodiments, while the life determination means 8 uses Equation (1) and Equation (2), the life determination time may be calculated using only one of the formulae. Alternatively, Equation (1) and Equation (2) need not to be used, and the life determination time may be calculated by a method other than Equation (1), Equation (2), the function graph, and the matrix calculation table.

Equation (1), Equation (2), the function graph, and the matrix calculation table may be used together in any combination.

Furthermore, in the respective embodiments, while the states of both of the temperature and the humidity are detected as the environmental conditions, the environmental condition of any one of the temperature or the humidity may be detected, and the life of the encoder may be determined based on the detection result of the state.

In short, the life detection device for the encoder only need to include the environmental condition detection means that detects the environmental condition related to the life detection in the encoder and the life determination means that determines the life of the component constituting the encoder based on the detection result by the environmental condition detection means.

INDUSTRIAL APPLICABILITY

As described above, the invention can be suitably utilized in a life detection device for an encoder that can determine a life of the encoder based on an environmental condition of a usage environment.

REFERENCE SIGNS LIST 1, 1A to 1D Encoder
2, 2B, 2D Scale frame
21 Scale
22 Graduation
3, 3B, 3D Head
31 Light source
32 Light-receiving means
4, 4A to 4D Life detection device
5, 5A to 5D Environmental condition detection means
50 Cumulative total time measurement unit
51 Temperature detection unit
51A, 51D Environment detection unit
52 Humidity detection unit
52D Environment detection unit
53 Current detection unit
511 Cumulative total temperature measurement unit
522 Cumulative total humidity measurement unit
533 Cumulative total current measurement unit
6 Computing means
8, 8A Life determination means
9 Informing means

The invention claimed is:

1. A life detection device for an encoder used for the encoder including a scale and a head, the scale being housed in a scale frame, the head relatively moving along the scale to detect an amount of relative movement with the scale, the life detection device for the encoder comprising:
environmental condition detection means configured to detect an environmental condition related to life detection in the encoder;
life determination means configured to determine a life of a component constituting the encoder based on a detection result by the environmental condition detection means; and
informing means configured to inform the life based on a determination result by the life determination means, wherein
the environmental condition detection means includes:
a temperature detection unit configured to detect a temperature as the environmental condition;
a cumulative total time measurement unit configured to measure a cumulative total operating time of the encoder; and
a cumulative total temperature measurement unit configured to measure a cumulative total temperature in the cumulative total operating time, wherein
the life detection device includes computing means configured to compute an average temperature value using the cumulative total operating time and the cumulative total temperature, and the life determination means is configured to determine the life of the component based on the cumulative total operating time and the average temperature value.

2. The life detection device for the encoder according to claim 1, wherein the computing means is configured to compute the average temperature value TAVE, and the life determination means is configured to calculate a life determination time H1 using the average temperature value TAVE, a first constant B, and a second constant C by Equation (1), the life determination time H1 being used by the life determination means for the determination, the life determination means being configured to determine the life of the component based on the life determination time H1 and the cumulative total operating time, $$H1 = e^{B/TAVE} + C \quad (1).$$

3. A life detection device for an encoder used for the encoder including a scale and a head, the scale being housed in a scale frame, the head relatively moving along the scale to detect an amount of relative movement with the scale, the life detection device for the encoder comprising:

environmental condition detection means configured to detect an environmental condition related to life detection in the encoder;

life determination means configured to determine a life of a component constituting the encoder based on a detection result by the environmental condition detection means; and informing means configured to inform the life based on a determination result by the life determination means, wherein the environmental condition detection means includes:

a humidity detection unit configured to detect a humidity as the environmental condition;

a cumulative total time measurement unit configured to measure a cumulative total operating time of the encoder; and a cumulative total humidity measurement unit configured to measure a cumulative total humidity in the cumulative total operating time, wherein the life detection device includes computing means configured to compute an average humidity value using the cumulative total operating time and the cumulative total humidity, and the life determination means is configured to determine the life of the component based on the cumulative total operating time and the average humidity value.

4. The life detection device for the encoder according to claim 3, wherein the computing means is configured to compute the average humidity value RHAVE, and the life determination means is configured to calculate a life determination time H2 using the average humidity value RHAVE, a first constant B, and a second constant C by Equation (2), the life determination time H2 being used by the life determination means for the determination, the life determination means being configured to determine the life of the component based on the life determination time H2 and the cumulative total operating time, $$H2 = e^{B/RHAVE} + C \quad (2).$$

5. The life detection device for the encoder according to claim 1, wherein the environmental condition detection means includes:

a current detection unit configured to detect a change in current in the component;

a cumulative total time measurement unit configured to measure the cumulative total operating time of the encoder; and a cumulative total current measurement unit configured to measure a cumulative total current in the cumulative total operating time of the encoder, wherein the life detection device includes computing means configured to compute an average current value using the cumulative total operating time and the cumulative total current, and the life determination means is configured to determine the life of the component based on an average value based on the environmental condition detected by the environmental condition detection means, the average current value, and the cumulative total operating time.

6. A life detection device for an encoder used for the encoder including a scale and a head, the scale being housed in a scale frame, the head relatively moving along the scale to detect an amount of relative movement with the scale, the life detection device for the encoder comprising:

environmental condition detection means configured to detect an environmental condition related to life detection in the encoder;

life determination means configured to determine a life of a component constituting the encoder based on a detection result by the environmental condition detection means; and informing means configured to inform the life based on a determination result by the life determination means, wherein the environmental condition detection means includes:

an environment detection unit configured to detect a temperature, a humidity, and a current as the environmental condition as a detection result;

a cumulative total time measurement unit configured to measure a cumulative total operating time of the encoder; and a cumulative total result measurement unit configured to measure a cumulative total result of the detection result detected by the environment detection unit in the cumulative total operating time, wherein the life detection device includes:

computing means configured to compute an average value of each of the temperature, the humidity, and the current using the cumulative total operating time and the cumulative total result; and storage means that stores a plurality of failure rate functions for calculating a failure rate of the encoder, wherein the life determination means is configured to:

extract an optimal failure rate function to calculate the failure rate from the plurality of failure rate functions stored in the storage means based on the average value and the cumulative total operating time;

calculate the failure rate based on the optimal failure rate function and the cumulative total operating time; and determine the life of the component based on the failure rate.

7. A life detection device for an encoder used for the encoder including a scale and a head, the scale being housed in a scale frame, the head relatively moving along the scale to detect an amount of relative movement with the scale, the life detection device for the encoder comprising:
- environmental condition detection means configured to detect an environmental condition related to life detection in the encoder;
- life determination means configured to determine a life of a component constituting the encoder based on a detection result by the environmental condition detection means; and
- informing means configured to inform the life based on a determination result by the life determination means, wherein the environmental condition detection means includes:
- an environment detection unit configured to detect a temperature, a humidity, and a current as the environmental condition as a detection result;
- a cumulative total time measurement unit configured to measure a cumulative total operating time of the encoder; and
- a cumulative total result measurement unit configured to measure a cumulative total result of the detection result detected by the environment detection unit in the cumulative total operating time, wherein the life detection device includes:
- computing means configured to compute an average value of each of the temperature, the humidity, and the current using the cumulative total operating time and the cumulative total result; and
- a matrix calculation table to which the average value is inputtable, the average value being to derive an optimal failure rate function for calculating a failure rate of the encoder, wherein the life determination means is configured to:
- calculate the failure rate based on the optimal failure rate function derived from the matrix calculation table and the cumulative total operating time; and
- determine the life of the component based on the failure rate.

8. The life detection device for the encoder according to claim 1, wherein
the encoder is a photoelectric encoder including a light source, a scale, and light receiving means, the light source being configured to irradiate light, the scale having a graduation disposed along a measuring direction, the light receiving means being configured to receive the light irradiated from the light source via the scale, and
the components are the light source, the graduation of the scale, and the light receiving means.

9. The life detection device for the encoder according to claim 1, wherein
the informing means is any of an alarm, light emitting means, and display means, the alarm being configured to inform the life based on the determination by the life determination means, the light emitting means being disposed outside the encoder, the display means being configured to display the life.

10. The life detection device for the encoder according to claim 1, wherein
the environmental condition detection means is disposed inside the head.

11. The life detection device for the encoder according to claim 1, wherein
the environmental condition detection means is disposed inside the scale frame.

12. The life detection device for the encoder according to claim 1, wherein
the environmental condition detection means is disposed outside the encoder.

13. The life detection device for the encoder according to claim 1 comprising:
communication means including an environment detection unit and a reception unit, the environment detection unit having a transmission function, the transmission function being configured to detect a state of at least any one of a temperature, a humidity, and a current and transmit a detection result of the state, the reception unit being configured to receive the detection result from the environment detection unit, and
the life determination means is configured to determine the life of the component constituting the encoder based on the detection result via the communication means.

* * * * *